Figure 3:
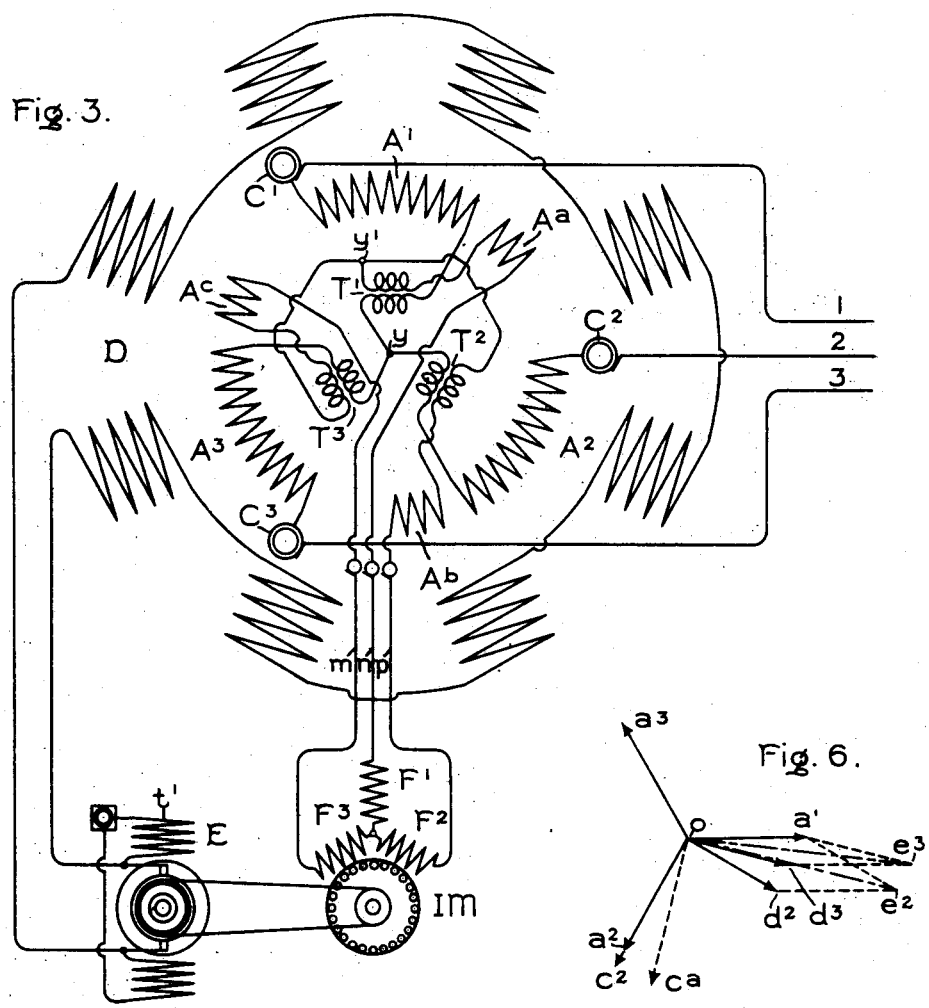

No. 713,022.  
C. P. STEINMETZ.  
COMPOUNDING ALTERNATORS.  
(Application filed Apr. 16, 1902.)  
Patented Nov. 4, 1902.
(No Model.) 3 Sheets—Sheet 1.
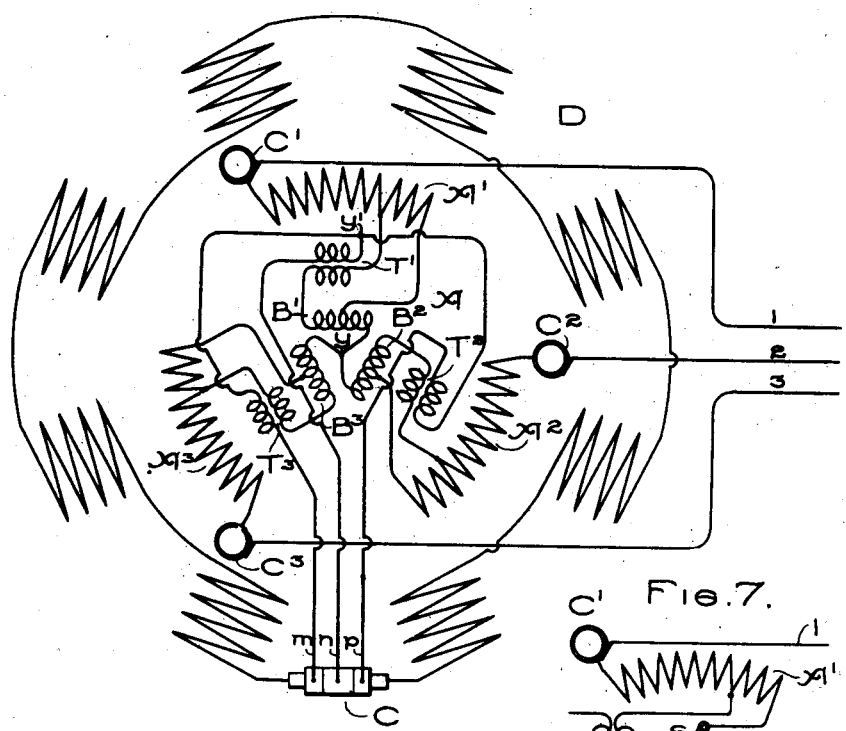
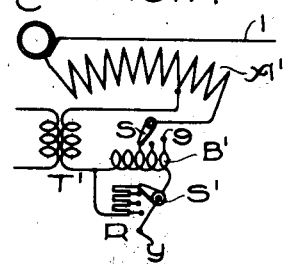
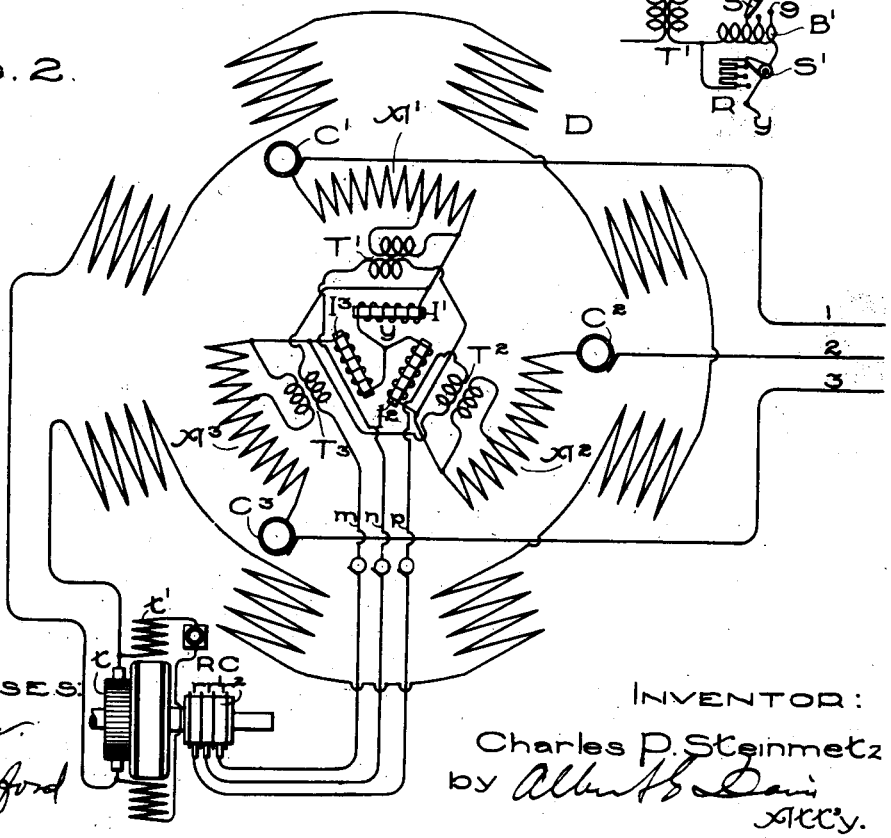
WITNESSES:
A. Tilden.
Helen Orford
INVENTOR:
Charles P. Steinmetz
by Albert G. Davis
Att'y.
THE NORRIS PETERS CO., PHOTO-LITHO., WASHINGTON, D. C.

No. 713,022. Patented Nov. 4, 1902.
C. P. STEINMETZ.
COMPOUNDING ALTERNATORS.
(Application filed Apr. 16, 1902.)
(No Model.) 3 Sheets—Sheet 2.

Witnesses:
George H. Tilden
Helen Orford

Inventor:
Charles P Steinmetz
By Albert H. Davis
Att'y.

No. 713,022. Patented Nov. 4, 1902.
C. P. STEINMETZ.
COMPOUNDING ALTERNATORS.
(Application filed Apr. 16, 1902.)
(No Model.) 3 Sheets—Sheet 3.

Witnesses.
George W. Tilden
Helen Orford

Inventor.
Charles P. Steinmetz.
By Allen H. Davis
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

COMPOUNDING ALTERNATORS.

SPECIFICATION forming part of Letters Patent No. 713,022, dated November 4, 1902.

Original application filed August 20, 1897, Serial No. 648,874. Divided and this application filed April 16, 1902. Serial No. 103,184. (No model.)

*To all whom it may concern:*

Be it known that I, CHARLES P. STEINMETZ, a citizen of the United States, residing at Schenectady, county of Schenectady, State of New York, have invented certain new and useful Improvements in Compounding Alternators, (Case No. 2,829, division of my prior application, Serial No. 648,874, filed August 20, 1897,) of which the following is a specification.

The object of my invention is to provide an efficient method of regulating alternating-current generators of one or more phases both for changes of load and changes of phase relation between current and electromotive force in the main circuit. The field excitation of the generator should increase with increased load and with lagging current and decrease with diminished load and with leading current.

I have designed the present invention to secure satisfactory regulation of the character described.

Various embodiments of the invention will be hereinafter particularly described. The features of the invention, whether carried out in these ways or in other possible modified ways, are defined in the claims.

As a regulating means I have aimed to secure an electromotive force or electromotive forces which will rise and fall in value with changes of load and which will also rise when the main current lags and fall if the main current leads in a ratio corresponding with the changes of load or phase displacement. Having secured such an electromotive force or electromotive forces, I am enabled to derive therefrom a corresponding current of changing value with which to properly regulate or control the regulation of the generator. As the load changes the current will correspondingly change, and from the current I can in a variety of ways secure an electromotive force varying with the load, to this extent realizing the object of the invention. Going a step farther, if an auxiliary electromotive force changing in value and phase with corresponding changes of current is combined with an electromotive force developed in a coil on the generator and if the phase relation of the electromotive forces so combined is such that the auxiliary electromotive force leads the generator electromotive force by a proper angle, such that when the current lags the two electromotive forces shift more nearly in phase, and vice versa when the current leads, then the resultant electromotive force due to the combination will tend to increase in value with lagging currents and to decrease with leading currents, thereby securing an electromotive force changing both with the load and with the phase displacement which renders possible in practice the desired regulation. I have therefore provided means for deriving an auxiliary electromotive force of the character described coupled with means for combining such an electromotive force with a generator electromotive force having the proper relative phase relation and means for regulating or controlling the regulation directly or indirectly of the generator by the resultant electromotive force and current so obtained.

Describing now more specifically some of the ways of practicing the invention, one method is to provide transformer devices, either compensators or ordinary two-coil transformers, in the circuit of the generator-current. The current will induce in the transformer device a secondary transformed electromotive force, changing in value and phase with the current and practically in quadrature with the main generator electromotive force at non-inductive load, though this value varies with lag and lead of the current. This supplies the auxiliary electromotive force, which, as already explained, is combined with a generator electromotive force, thus furnishing resultant electromotive force and current having the desired characteristics. A second method is to employ reactive coils or other inductive impedances in place of the transformer devices. Electromotive forces will thereby be induced practically ninety degrees behind the current, and in a three-phase machine these electromotive forces will consequently be thirty degrees ahead of the electromotive forces developed, respectively, in the generator-coils of the preceding phase. Then by combining the electromotive forces generated in the impedances with the generator electromotive forces of the preceding phase resultant electromotive forces and currents will also be secured rising and falling in value in the necessary and proper ratio.

The drawings annexed are diagrams showing different ways of carrying out this invention.

Figure 6:
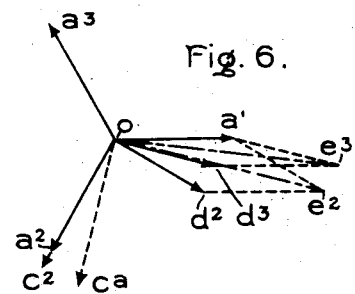
Figure 4:
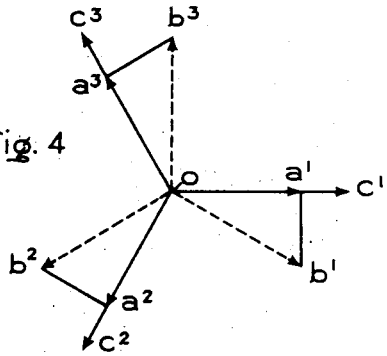
Figure 5:
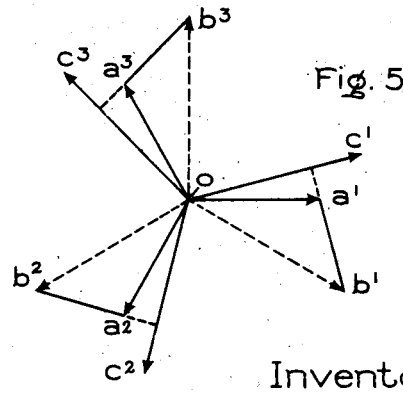
Figure 8:
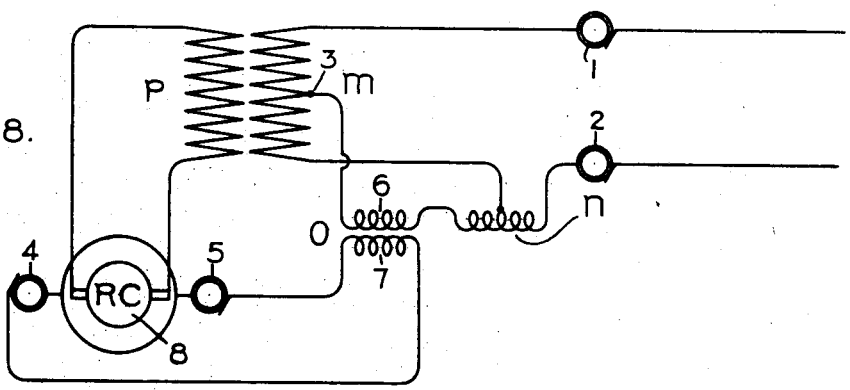
Figure 9:
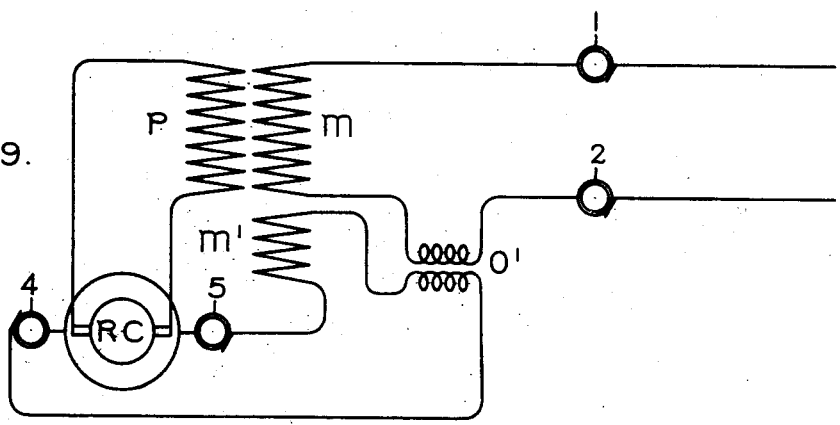
Figure 10:
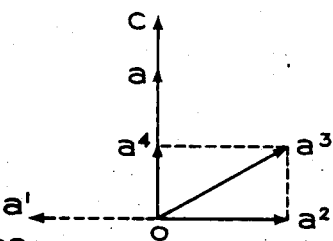
Figure 11:
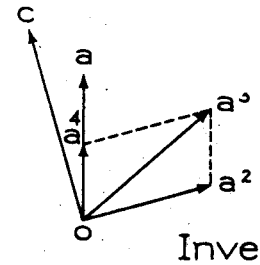

Figure 1 shows a three-phase machine with compensators in the different branches of the machine. Fig. 2 shows a similar machine combined with inductive coils instead of compensators. Fig. 3 shows a modification. Figs. 4, 5, and 6 are diagrams introduced to help in explaining the working of my invention as now understood. Fig. 7 is a diagram showing an additional feature of the invention. Figs. 8 and 9 show ways of applying the invention to single-phase machines, and Figs. 10 and 11 are further explanatory diagrams.

I will first explain how the invention is applied to a single-phase machine, since the connections are somewhat less intricate. For this purpose I refer to the figures on Sheet 3 of the drawings.

In Fig. 8, M is the armature or generator winding of a single-phase alternator. One terminal is connected to line through the collector-ring 1, and the second terminal leads, as shown, to an intermediate point in the winding of a compensator or single-coil transformer N. One terminal of the compensator leads to the line-circuit through the second collector-ring 2, and the second terminal is brought back and tapped into the generator-winding, as at 3. The primary 6 of a two-coil transformer O is included in circuit between the compensator and point 3. The current developed in the secondary 7 of the transformer O may be used for regulating or controlling the regulation of the alternator in a variety of ways. For this purpose I have shown a rotary converter of a well-known type, having a closed circuit-winding connected at two diametrically opposite points with the secondary of the transformer O through collector-rings 4 and 5. The rectified current is taken from commutator 8 and passed through the exciting-winding P of the alternator. Such an arrangement will regulate in the manner described.

According to my present understanding of the invention I will now explain the electrical actions taking place when the described apparatus is in operation. For this purpose I refer to Figs. 10 and 11. Let $oa^4$ represent the electromotive force developed in a selected portion of the generator-winding M, the electromotive force of the winding M being represented by $oa$, and $oc$ the generator-current, on the assumption that the current is in phase with the electromotive force. The primary electromotive force developed in the compensator will be practically in quadrature behind the current, as shown by dotted line $oa'$. The secondary transformed electromotive force developed in the compensator will be one hundred and eighty degrees from $oa'$, and therefore practically ninety degrees ahead of the generator electromotive force $oa$. With the apparatus connected as described the electromotive force in the primary circuit of the transformer O will therefore be the resultant $oa^3$ of electromotive forces $oa^4$ and $oa^2$. If the load changes without change of phase, the component electromotive force $oa^2$ will change in value correspondingly, and hence also the resultant electromotive force. If the load becomes inductive and the current lags, as at $oc$ in Fig. 11, the auxiliary electromotive force $oa^2$ will shift with the current, approaching more nearly the generator electromotive force $oa$. The line $oa^3$, representing the resultant electromotive force, is longer than the corresponding line in Fig. 10, showing that under the new conditions the resultant electromotive force has an increased value. By constructing a similar diagram representing the main-current leading it will be found that the line $oa^3$ shortens and the resultant electromotive force is reduced.

Fig. 9 has been introduced to show that an ordinary two-coil transformer may be used instead of a compensator and that the generator electromotive force, with which the auxiliary electromotive force is combined, may be developed in a separate winding. In this figure, M represents, as before, the main generator-winding, connected to line through collector-ring 1 and at the other terminal through the primary coil of a two-coil transformer O' and the second collector-ring 2.

A separate generator-winding M' is provided, in which an electromotive force is developed, preferably, of the same phase as the electromotive force of the main winding. The secondary transformer O' and the generator-winding M' are connected in series, and the current developed in this circuit is used for regulating the alternator. For so doing I have shown, as before, a rotary converter rectifying the alternating current and furnishing the exciting-current for the field-magnet winding P of the alternator.

In Fig. 1 the invention is shown as applied to a three-phase machine. D is the field-magnet-exciting circuit wound in the ordinary way. The armature-coils A' A² A³ have, respectively, one terminal connected to the circuit-mains 1 2 3 through collector-rings C' C² C³. The other terminals of the coils are connected to intermediate points in the windings of three corresponding compensators B' B² B³. One of the terminals of each of these compensators is connected to a common joint at $y$, so that, in effect, the armature-coils are Y-connected, but include portions of the compensator-windings between the coils and the common joint. The other terminal of compensator B' is connected to a point in the generator-winding A'. In this circuit is included the primary of an ordinary two-coil transformer T'. Similarly compensator B² has one terminal connected to armature-coil A² through the primary of transformer T², and compensator B³ is connected to armature-coil A³ through the primary of transformer T³. The secondaries of transformers T' T² T³ are interconnected, (as shown in the drawings Y-connected at a common joint $y'$,) and the free terminals are connected by leads $m$ $n$ $p$ to a rectifying-commutator C, properly constructed to rectify the current in the secondary-transformer circuits and deliver the rectified current to the field-magnet winding of the machine.

The diagrams Figs. 4 and 5 are introduced to explain the actions taking place in the machine of Fig. 1. These will be readily understood after the explanation already given of the actions in a single-phase machine. It is sufficient to note that the main generator three-phase electromotive forces are represented by lines $oa'$ $oa^2$ $oa^3$. In Fig. 4 the currents are assumed to be in phase and are therefore represented by lines $oc'$ $oc^2$ $oc^3$. The secondary electromotive forces developed in the compensators will be practically ninety degrees ahead of the main generator electromotive forces and currents and are represented by lines $a'$ $b'$ $a^2$ $b^2$ $a^3$ $b^3$. The dotted lines $ob'$ $ob^2$ $ob^3$ therefore represent the resultant electromotive forces generated in the secondary circuits of transformers T' T² T³ and used for supplying the exciting-current.

In Fig. 5 the current is shown lagging a few degrees behind the generator electromotive force, $oa'$ $oa^2$ $oa^3$ representing the generator electromotive forces, and $oc'$ $oc^2$ $oc^3$ the currents, as before. The secondary electromotive forces in the compensators will shift with the current, thereby forming a more acute angle with the generator electromotive forces when the current lags. The resultant electromotive forces $ob'$ $ob^2$ $ob^3$ have an increased value as compared with the diagram Fig. 4, which of course means that the electromotive forces furnishing the exciting-current have risen in value, thereby also raising the potential of the machine and compounding for the lagging currents.

In Fig. 2 is shown a three-phase machine with inductive reactances for generating the auxiliary electromotive forces. D is the field-magnet winding, and A' A² A³ the armature-coils connected to line through collector-rings C' C² C³, as before. The armature-coils have their other terminals connected at the common joint $y$ through inductive coils I' I² I³. The transformers T' T² T³ have their primaries connected, respectively, across a portion of the winding of generator A' A² A³. The secondary of transformer T' is connected between the outer terminal of reactive coil I² and armature-coil A². So, also, the secondary of transformer T² is connected between reactive coil I³ and armature-coil A³. The secondary of transformer T³ is connected between reactive coil I' and armature-coil A'. The free terminals of the transformer secondaries are connected through leads $m$ $n$ $p$, collector-rings, and brushes to the alternating sides of a three-phase rotary converter RC. Collector-rings $r$ $r'$ $r^2$ are provided for the converter, of which $t$ is the commutator from which the rectified current is fed to the field-magnet winding D. The rotary converter is shown excited by a shunt-winding $t'$, taken from the direct-current side and including, if desired, the usual regulating-rheostat.

The construction described will work in accordance with my invention, though the actions are in certain respects different from those previously described. These differences I will try to make clear by referring to Fig. 6, in which $oa'$ $oa^2$ $oa^3$ represent the generator electromotive forces, as before. Assuming first that the currents are in phase with their respective electromotive forces, $oc^2$ will represent one of the currents. The auxiliary electromotive forces developed in the reactive coils will theoretically be ninety degrees behind the corresponding currents, and therefore the auxiliary electromotive force corresponding to and generated by current $oc^2$ will be represented by $od^2$. $od^2$ is ninety degrees behind the generator electromotive force $oa^2$, but (in the three-phase machine) thirty degrees ahead of the generator electromotive force of the preceding phase $oa'$. With the connections shown in Fig. 2 the reactive electromotive force $od^2$ is combined with an electromotive force of the preceding phase $oa'$, giving the resultant $oe^2$. If now the current lags through a certain phase-angle represented by $oc^a$, the corresponding reactive electromotive force will shift backward through a like angle approaching more nearly the generator electromotive force $oa'$, and the resultant of the combined electromotive forces $oe^3$ will have an increased value. There are illustrated in the diagram the actions taking place in a single phase only of the machine in order to render the diagram less complicated. Those skilled in the art, however, will from this explanation readily understand the operation of this modification as a whole.

In Fig. 3 is shown still another combination which may be employed in carrying out the invention. Like parts are represented by the same letters as in the other diagrams, and I will refer only to those points in which the construction is changed. The generator-coils A' A² A³ are here connected to a common joint $y$ through the primary coils of ordinary two-coil transformers. (Shown at T' T² T³.) The currents flowing in the generator-coils and the transformer primaries will induce the desired auxiliary electromotive forces in the transformer secondaries. These auxiliary electromotive forces are combined, as before, with generator electromotive forces; but the generator electromotive forces so combined are developed in separate windings $A^a$ $A^b$ $A^c$ on the generator. An examination of the diagram will show clearly how the transformer secondaries are interconnected at a common joint $y'$. The secondary of transformer $T'$ is connected in series with the generator-coil $A^a$, standing in the same phase as the main coil $A'$, and thence to the lead $n$. The secondary of transformer $T^2$ is likewise connected through generator-coil $A^b$, standing in the same phase with coil $A^2$, and to lead $p$. The secondary of transformer $T^3$ is connected to coil $A^c$, of the same phase as coil $A^3$, and to the lead $m$, so that the electromotive forces developed in the secondaries of the transformers are combined with the generator electromotive forces developed in coils $A^a$ $A^b$ $A^c$, giving suitable resultant electromotive forces and currents for compounding the machine. In this modification the currents so developed are fed over the lines $m$ $n$ $p$ to the primary windings $F'$ $F^2$ $F^3$ of an alternating-current three-phase induction-motor IM. The secondary of the motor is of high resistance, and its speed will vary within quite wide limits in proportion to the impressed voltage, rising with increased voltage, and vice versa. The induction-motor is shown geared to a direct-current-exciter machine E. This machine feeds current to the exciter-winding D of the alternator, and the exciting-current varies in the proper ratio for regulating the alternator, increasing, of course, with an increased speed of the exciter, which results from an increased voltage in the primary circuit of the driving induction-motor. The field-circuit $t'$ of the exciter-machine is shown coupled across the terminals of the machine. In other words, it is an ordinary shunt-wound exciter.

In Fig. 7 there are illustrated further features of the invention, showing how the compounding or regulating action may be varied in value and character. For the sake of clearness there are illustracted simply these additional features applied to a simple branch of a three-phase machine connected in other respects in the manner shown in Fig. 1. $A'$ is the alternating winding, whose terminals are connected to line through collector-ring $C'$ and to the common joint $y$. The compensator $B'$ is included in this circuit, and transformer $T'$ is in circuit, as before, between one terminal of the compensator and a point in the main generator-winding. A switch S, connected to the inner terminal of generator-coil $A'$, may be adjusted so as to vary the length of that portion of the compensator-coil included between the generator-coil and joint $y$. This is done by leading out taps 9 from various points in the compensator-winding to contacts arranged in the path of travel of switch S. This is a common expedient and will be well understood. By adjusting the length of this portion of the compensator-coils the value of the auxiliary electromotive forces for a given current can be changed, because the ratio of turns and of the transformation taking place between the two portions of the compensator-winding is changed. In this way I adjust the amount of compounding. I show, furthermore, a non-inductive resistance R, shunting the compensator $B'$, and a switch $S'$ for adjusting the value of the shunting resistance. In this way the nature of the compounding as regards phase displacement can also be adjusted.

What I claim as new, and desire to secure by Letters Patent of the United States, is—

1. The method of regulating an alternating-current generator, which consists in deriving from the current of the generator an electromotive force whose phase relation varies with that of the generator-current, combining said electromotive force with a generator electromotive force of such different phase relation that the combined electromotive forces will produce a resultant electromotive force and current, which will tend to increase when the generator-current lags, and tend to decrease when the current leads, and regulating or controlling the regulation of the generator by the current so produced.

2. The method of regulating an alternating-current generator, which consists in passing the current of the generator through an inductive device, deriving thereby an electromotive force changing in strength and phase relation with the generator-current, combining said electromotive force with a generator electromotive force of such different phase relation that the combined electromotive forces shift more nearly in phase when the current lags, and more out of phase when the current leads, and regulating, or controlling the regulation of, the generator by a current produced by such resultant electromotive forces and sharing like changes in value, as set forth.

In witness whereof I have hereunto set my hand this 14th day of April, 1902.

CHARLES P. STEINMETZ.

Witnesses:
 BENJAMIN B. HULL,
 HELEN ORFORD.